United States Patent [19]

Wada et al.

[11] Patent Number: 5,485,406
[45] Date of Patent: Jan. 16, 1996

[54] APPARATUS AND METHOD FOR DETERMINING THE PROFILE OF THE TREAD OF A TIRE

[75] Inventors: Yasuo Wada, Amagasaki; Kazuo Asano, Kobe, both of Japan

[73] Assignee: Sumitomo Rubber Industries, Ltd., Hyogo, Japan

[21] Appl. No.: 96,837

[22] Filed: Jul. 26, 1993

Related U.S. Application Data

[63] Continuation of Ser. No. 646,258, Jan. 28, 1991, abandoned.

[30] Foreign Application Priority Data

Jan. 31, 1990 [JP] Japan ......................................... 2-22553

[51] Int. Cl.⁶ .......................... G01B 11/00; G01B 11/24; G01B 11/08
[52] U.S. Cl. .............................. 364/560; 73/146; 33/551; 356/376
[58] Field of Search ................................... 73/146, 146.2; 356/3, 376, 377; 33/551, 554; 364/560, 562

[56] References Cited

U.S. PATENT DOCUMENTS

| | | | |
|---|---|---|---|
| 3,918,816 | 11/1975 | Foster et al. | 73/146 X |
| 4,275,589 | 6/1981 | Dugger et al. | 73/146 |
| 4,413,905 | 11/1983 | Holzapfel | 356/4.5 X |
| 4,457,625 | 7/1984 | Greenleaf et al. | 356/4.5 X |
| 4,670,289 | 6/1987 | Miller, III | 73/146 X |
| 4,721,388 | 1/1988 | Takagi et al. | |
| 4,783,992 | 11/1988 | Ishibashi | 73/146 |
| 4,866,642 | 9/1989 | Obrig et al. | 364/560 X |
| 4,936,138 | 6/1990 | Cushman et al. | 73/146 |
| 5,060,173 | 10/1991 | Tsuji | 73/146 X |
| 5,245,867 | 9/1993 | Sube et al. | 73/146 |
| 5,249,460 | 10/1993 | Dory et al. | 73/146 |

FOREIGN PATENT DOCUMENTS

| | | |
|---|---|---|
| 0328384 | 8/1989 | European Pat. Off. . |
| 62-102110 | 6/1987 | Japan . |

OTHER PUBLICATIONS

Japanese Utility Model Publication SHO 61-102110 (English Translation).

Primary Examiner—Emanuel T. Voeltz
Assistant Examiner—Patrick J. Assouad
Attorney, Agent, or Firm—Birch, Stewart, Kolasch & Birch

[57] ABSTRACT

The invention provides an apparatus, and a method, for detecting the tread profile of a tire mounted about an X-axis comprising a non-contact Y detection means movable in parallel to the X-axis for measuring the distance at a right angle between such means and the peripheral surface of the tread profile in the direction of the Y-axis, X detection means for detecting the position of the Y detection means along the direction of the X-axis, data memory means for storing X and Y data pairs obtained by both such detection means, and radius calculating means for calculating the radius of the article from the X and Y data stored in the data memory means. The radius calculating means includes division means for dividing the X and Y data for a plurality of portions of the tread profile based on predetermined reference values for the tread profile of the tire being measured and arithmetic means for determining the radii of the respective portions each from the corresponding data divided by the division means, the arithmetic means determining the circle equation of: $x^2 + y^2 + ax + by + c = 0$, from the X and Y data to calculate the radius of the tread profile, the coefficients a, b and c of the circle equation being determined by least square approximation.

9 Claims, 4 Drawing Sheets

APPARATUS AND METHOD FOR DETERMINING THE PROFILE OF THE TREAD OF A TIRE

This application is a continuation of application Ser. No. 07/646,258 filed on Jan. 28, 1991, now abandoned.

The present invention relates to an apparatus and method for determining the profile of articles and particularly that of circular articles such as tires.

BACKGROUND OF THE INVENTION

Japanese Utility Model Publication SHO 62-102110 discloses an apparatus for measuring the radius of a tire tread. This comprises a means for measuring the crown radius of a tire which is an optical sensor for measuring the distance to the crown portion of the tire from the sensor without contact to the tire. The sensor is mounted so that it can be moved in the direction of the axis of the tire and thus scan across the tread region. The output signals in relation to the distance from the sensor to the surface of the tire and the position of the optical sensor in relation to the axial direction of the tire are both used to calculate the profile of the tire crown portion by means of measuring three points on the tread profile and calculating from the said three points.

Thus, the conventional apparatus for measuring the radius of the crown of a tire is adapted to determine the crown radius from three points on the tread profile and is therefore unable to accurately and rapidly measure the profile of the tread shoulder portions. Furthermore the apparatus fails to give measurements of sufficiently high accuracy since it does not measure variations in crown shape and simply averages over three points.

SUMMARY OF THE INVENTION

An object of the present invention is to provide an apparatus to determine the profile of articles which is adapted to determine the radius of curvature in short section of the article with higher accuracy.

According to one aspect of the present invention an apparatus for determining the profile of an article comprises:

mounting means for the article about an X axis, a non-contact type Y distance measuring means arranged to measure in the Y axis direction perpendicularly and towards the X axis and movable in the X axis direction, X detection means for sensing the position of the Y measuring means in the direction of the X axis;

data memory means for storing the X positions and the corresponding Y distance measurement data obtained, and radius calculating means for calculating the radius of at least part of the surface of the article from the digital X and Y data stored in the data memory means, the radius calculating means having division means for dividing the X and Y data for a plurality of portions of the article based on predetermined reference values and arithmetic means for determining the radii of the respective portions each from the corresponding data divided by the division means, the arithmetic means operating to determine the equation of the circle of:

$$x^2+y^2+ax+by+c=0$$

from the X and Y data to calculate the radius of the article, the coefficients a, b and c of the circle equation being determined by least square approximation.

The apparatus may be used for measuring the peripheral surface of a tire and in that case the mounting means holds the tire with the axis of the tire in the X axis direction.

The Y measuring means is preferably a laser sensor movable in the direction of the X axis. The movement in the direction of the X axis may be provided by a feed screw engaging the Y measuring means and disposed parallel to the X axis. A rotary encoder for the feed screw may be used to detect rotation of the feed screw to give the X data.

The data memory means and the radius calculating means are preferably a computer.

The apparatus may also include rotation means for the article so that it can be rotated about its X axis and angular position R detection means are provided to detect the angle of rotation of the article and provide an R data output. Data memory means are then provided to store said R angle data and the apparatus further comprises radial runout (RRO) calculation means to determine the radial runout of the article from the Y and R data in the memory means.

Another aspect of the invention provides a method of detecting the profile of an article comprising mounting the article in the apparatus of claim 1, measuring the Y distance from the Y distance measuring means to the outer surface of the article, sensing the position of the Y measuring means in the X direction to give an X value corresponding to said measured Y distance, storing the two X and Y values thereby obtained, repeating Y distance measurement for a different X direction position of the Y distance measuring means several times to obtain a series of X and Y data, calculating the radius of at least part of the surface of the article from the stored X and Y data values by means of dividing the X and Y data for a plurality of portions of the article based on predetermined reference values and applying arithmetic means to determine the radii of the respective portions from the corresponding data divided by the division means, the arithmetic means operating to determine the equations of the circle $$x^2+y^2+ax+by+c=0$$

from the X and Y data to calculate the radius of the article where the coefficients a, b and c are determined by least square approximation.

From this equation the radius is given by $$((a/2)^2+(b/2)^2-c)^{1/2}$$

Preferably the method is applied to the measurement of a profile of a tire when the X and Y data are divided into groups for the crown and shoulder portions of the tire respectively.

The method also includes computation of radial runout of the tire using R angle data corresponding to particular X and Y values for rotation of the tire.

BRIEF DESCRIPTION OF THE DRAWINGS

Further aspects of the present invention will become apparent from the following description, by way of example only, of an embodiment of the apparatus:

FIG. 1(*b*) is a diagram illustrating the basic concept of the apparatus;

DETAILED DESCRIPTION OF THE INVENTION

Figure 1A:
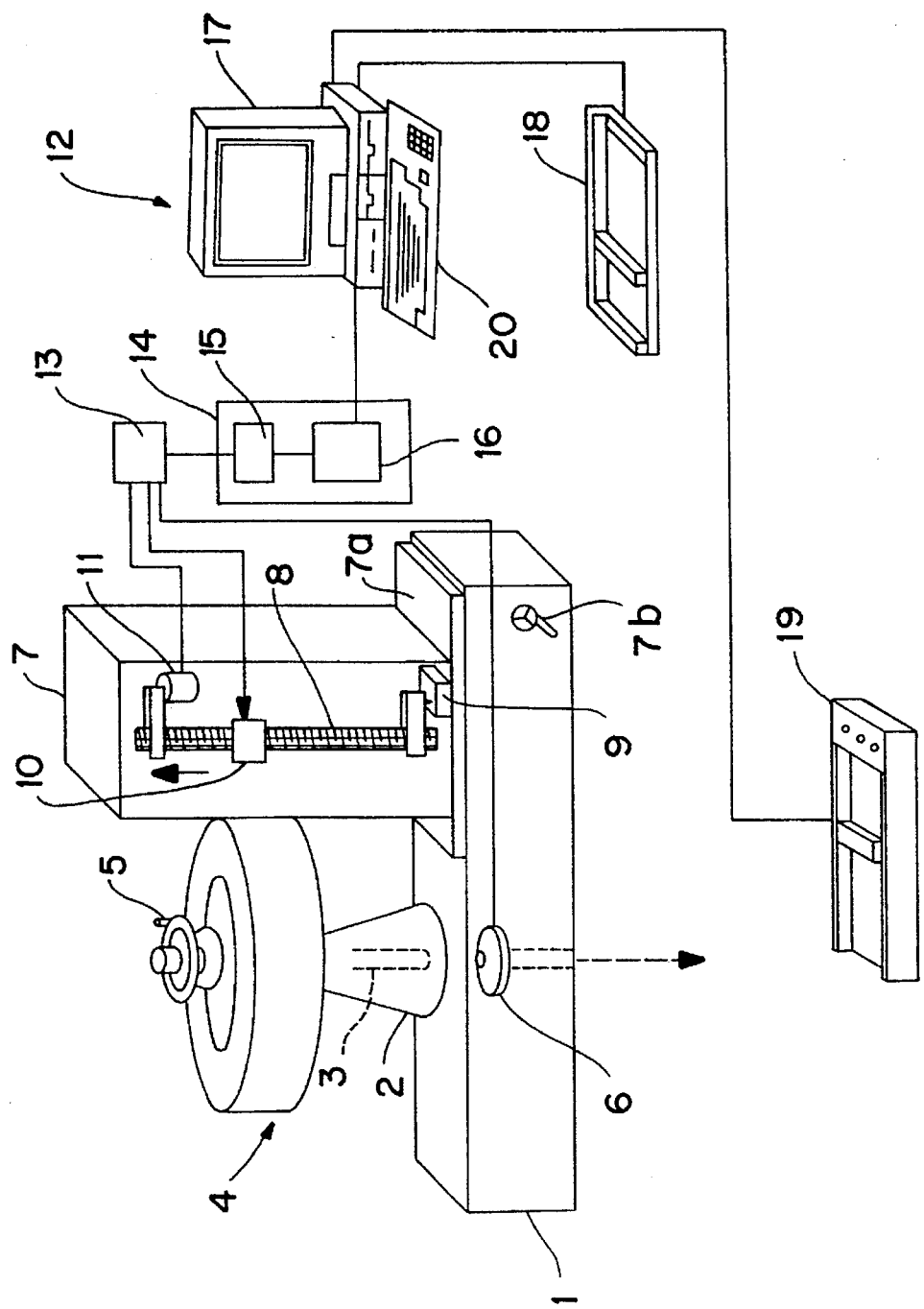
FIG. 1(*a*) is a perspective diagram of an apparatus for determining the profile of tires.
Figure 1B:
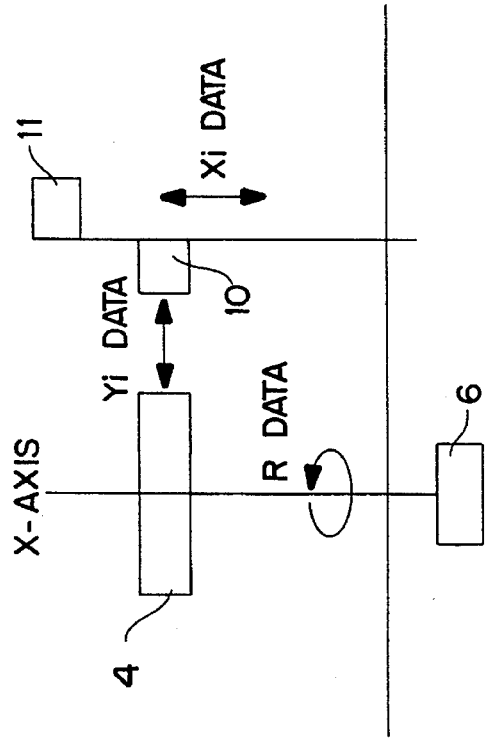

A tire mount 2 is fixedly provided on a base 1, The tire 4 is mounted on a rotatable shaft 3 which extends in a vertical direction. The axis of the shaft 3 will hereinafter be referred to as the "X-axis". A handle 5 is fixed to the upper end of the shaft 3 for rotating the shaft 3 and thus the tire 4. The shaft 3 is provided at its lower end with a R detection means 6 for sensing the angle of rotation R of the shaft 3. The R detection means 6 comprises a rotary encoder.

The base 1 is provided with rails (not shown) on which a movable table 7a is slidably mounted for movement in a horizontal direction (hereinafter referred to as the "direction of the Y-axis") intersection the X-axis at right angles. The table 7a is movable by rotating a threaded rod (not shown) by a handle 7b.

The movable table 7a carries a measuring unit 7 thereon. The measuring unit 7 has a rotatable feed screw 8 extending vertically parallel to the X-axis. A motor 9 for rotating the feed screw 8 is provided in the lower portion of the measuring unit 7. A Y distance measuring means 10 is mounted in the measuring unit 7 in a screw-thread engagement with the feed screw 8 and movable upwardly and downwardly by rotation of the feed screw 8. The Y measuring means 10 comprises a laser sensor and is able to measure the distance Yi from the peripheral surface of the tire 4 in the direction of the Y-axis without contacting the tire.

Coupled to the feed screw 8 is an X detection means 11 for measuring the position Xi of the Y detection means 10 with respect to the X-direction. The X detection means 11 comprises a rotary encoder for counting the number of revolutions of the feed screw 8. The position of the Y detection means 10 in the X-direction is found by multiplying the thread pitch of the feed screw 8 by the number of revolutions.

The range of movement in X-direction (widthwise of the tire) is such that measurements can be obtained for tires of every category.

A personal computer 12 provides a data memory means 13 for storing the data X, Y and R detections means 11, 10 and 6, and radius calculating means 14 for calculating the radius of the tire tread from the stored data. The calculating means 14 comprises division means 15 for dividing the Xi and Yi data into groups for a plurality of portions of the width of the tire such for example as the crown portion and shoulder portions, and arithmetic means 16 for calculating the radii of the respective crown and shoulder portions from the corresponding data group from the division means 15.

The computer 12 is connected to a display 17 and an X-Y plotter 18 to show the profile and radii of the section of the tire tested. Also connected to the computer is RRO display means 19 for displaying the RRO (radial runout) of the tire determined from the X and R data in the data memory means 13. The RRO display means 19 comprises an X-Y recorder.

Indicated at 20 is an input unit for the personal computer 12.

The radius of the tire is measured in the following manner.

First, the tire 4 is mounted and inflated on a rim and the assembly is mounted on the shaft 3. The shaft 3 is locked against rotation.

Next, the movable table 7a is moved in the Y-direction to set the distance Yi between the peripheral surface of the tire 4 and the Y measuring means 10 to a predetermined value.

The motor 9 is then continuously driven to continuously rotate the feed screw 8 and continuously move the Y measuring means 10. During this movement, measurement are taken for Yi at predetermined intervals. In this case, the distance Yi between the Y measuring means 10 and the peripheral surface of the tire 4 is measured by the Y measuring means 10, and the position Xi of the Y detection means 10 in the X-direction is measured by the X detection means 11.

Figure 2:
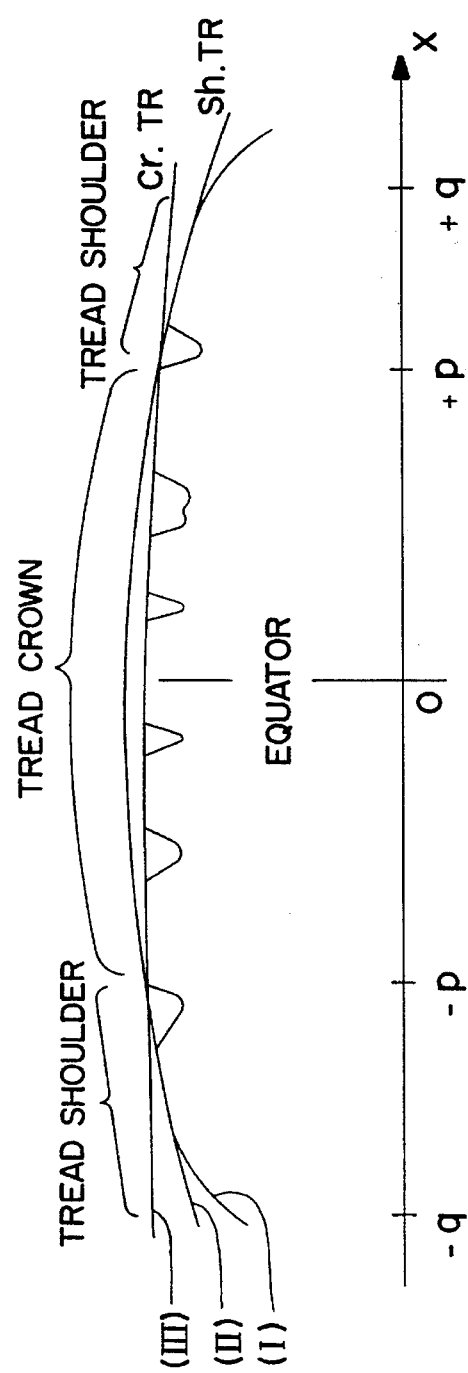
FIG. 2 is a graphical display showing the profile and radius of the tire.

Each pair of Xi and Yi data items is stored in the data memory means 13 of the computer 12 as the coordinates of a point. Using the data for a multiplicity of points thus stored, the profile of the tire 4 is calculated by the computer 12. The profile can be monitored as displayed on the display 17 as seen in FIG. 2 (I). The profile can also be displayed on the X-Y plotter 18.

At least five sets of data per centimeter of tire width are collected for the profile data.

Figure 3:
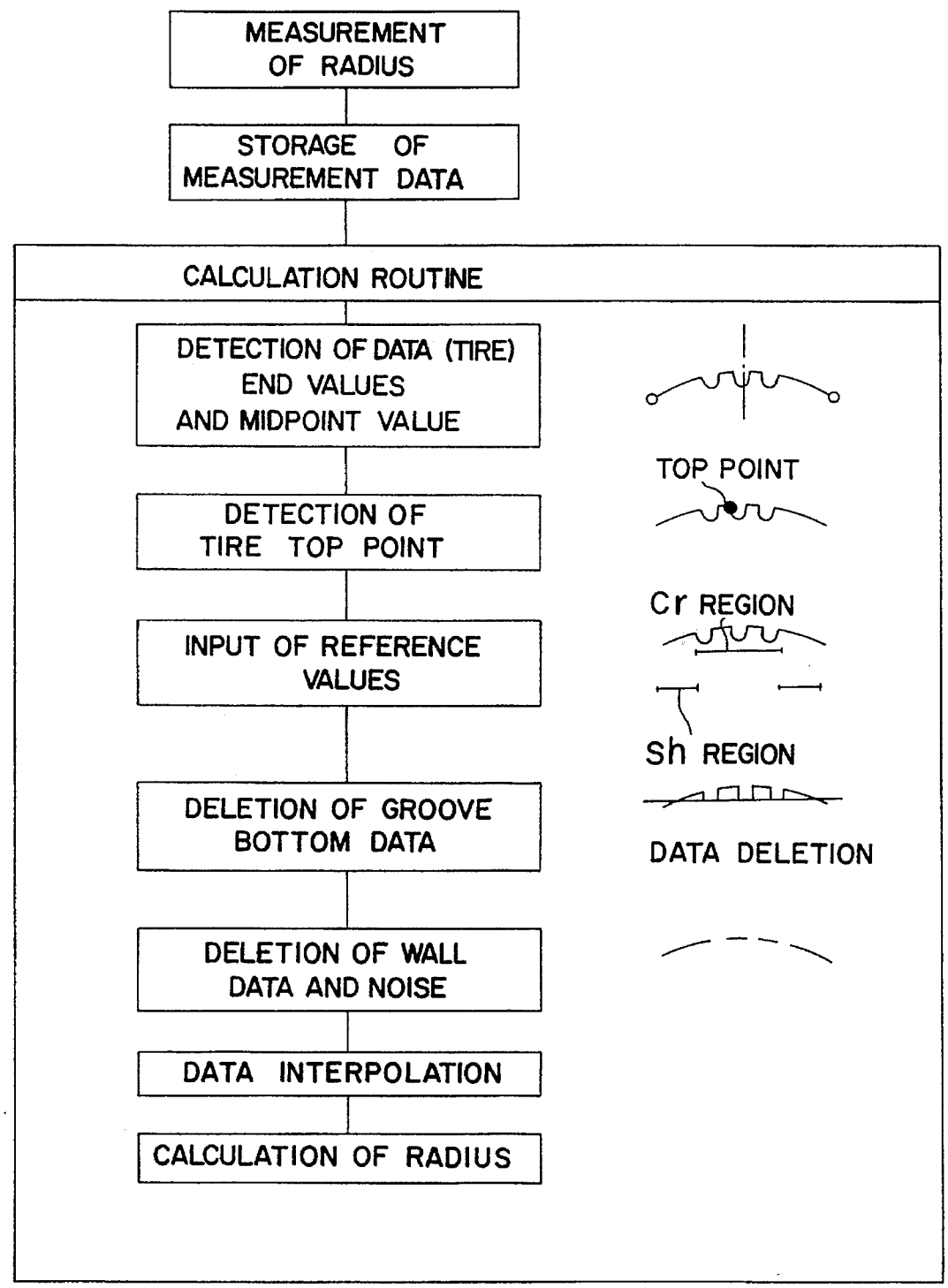
FIG. 3 is a flow chart showing the radius measuring procedure.

The procedure for determining the tread radius from Xi and Yi data in the data memory means 13 will be described next with reference to FIG. 3.

The data in the memory means 13 is first subdivided into groups by the division means 15. This can be into data for the tire crown portion and data for the shoulder portions.

The data is divided in the following manner.

First of all, opposite end values of the data are detected which mean the Xi and Yi data at each of opposite ends of the tire cross section.

The value X representing each end is determined by detecting the value Y equal to or exceeding a certain reference value. More specifically, the value Y is compared with the predetermined reference value, and upon the value Y being equal to or exceeding the reference value, the corresponding X value is taken as the end value of the X data.

When the values X at the opposite ends of the data are thus determined, the value X at the mid-point between the opposite ends is calculated. The calculated mid-point of the X data corresponds to or represents the equator of the tire and is used to divided the tread of the tire 4 into the crown portion and the should portions. A region is specified to either side of the center which is the portion of the tire equator to define the crown portion as shown in FIG. 3. The regions from these limits to the sides of the tire thus define the shoulder portions. Thus, the mid-point value of the data must be detected. The X data coordinate system is then so transformed that the mid-point value of X data serves as the origin of the X-axis.

Next, reference values are entered by the input unit 20 to specify the region for which calculation is to be performed. Thus, the reference values define the width of the crown portion or shoulder portion. These values to be entered represent the distance as measured from the equator.

After entering the reference values, the data between the opposite ends can be divided into the data as to the crown portion and the data as to the shoulder portions.

Suppose the region of the crown portion is specified as the range of from −p to +p. Of the data between the opposite ends, the X data from −p to +p is taken as the data as to the crown portion. Further, if the range of −q to −p and the range of +p to +q are entered as the regions of the shoulder portions, the X data from −q to −p and from +p to +q among other items of data between opposite ends is taken as the data for the shoulder portions.

In this way, the stored data is divided by the division means 15 into groups for the crown portion and shoulder portions.

Subsequently, the data for the bottoms of the grooves of the tire pattern is deleted from the data. The bottom data represents the grooves formed in the tire tread and if not detected and removed is an impediment to the calculation of an accurate radius of the tire crown portion or shoulder portions and must therefore be deleted.

The groove bottom data is identified by reference to Y values.

For this purpose, the data for the top point of the tire is detected first (subsequent to the detection of the opposite end values and mid-point value of the data).

The Y measurements which are above a certain reference value beyond the Y measurement of the top point are interpreted as being groove data. Different reference values are used for the crown portion and the shoulder portions. The groove bottom data identified as such is deleted so as not to be used in the subsequent calculation.

Next, the data for the groove wall portions and noise are deleted from the specified data since these are also an impediment to subsequent accurate calculation of the tire radius.

The data to be deleted is identified according to whether four consecutive Y values are smooth values.

More specifically, the value Yi is the data to be used when the four consecutive values of Yi, Yi+1, Yi+2 and Yi+3 fulfil the requirements of:

$$(Yi=Yi+1)^2 \leq d$$

$$(Yi=Yi+2)^2 \leq e$$

$$(Yi=Yi+3)^2 \leq f$$

wherein d, e and f are predetermined reference values.

The values failing to fulfil any one of the above requirements are deleted as inappropriate data.

When the deletion of data for the groove bottoms, groove walls and noise leaves in the resulting group of data items a blank section (corresponding to the deleted data) which is greater than a certain value, the blank section is filled by interpolated data.

More specifically, if the deleted blank section in the group of consecutive data items is longer than the predetermined value, this section is interpolated with data to make the data items sufficiently complete.

Figure 4:
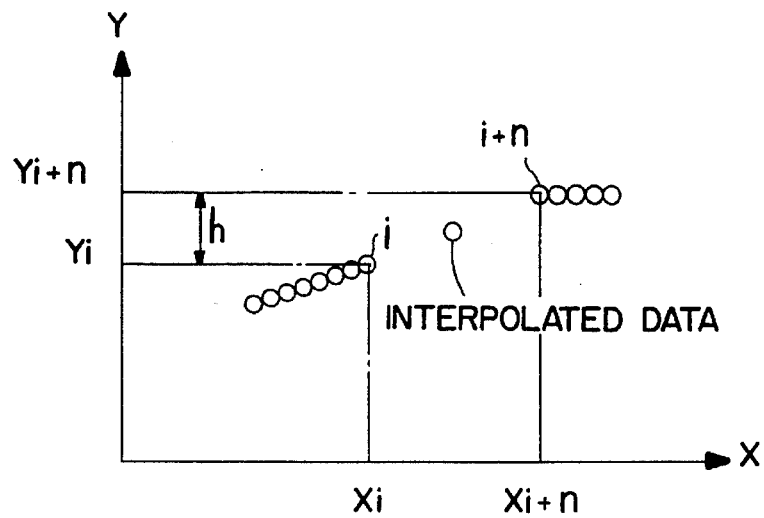
FIG. 4 is a diagram showing a method of interpolating the data.

Suppose if the data between the ith data and the (i+n)th data is deleted, producing a blank section longer than the predetermined value as seen in FIG. 4. The data of Yi+h/2 is then inserted as the (i+n/2)th position.

In this way, the data is divided for the crown portion and the shoulder portions by the division means 15, and the data to be used is determined. The radii of the crown portion and the shoulder portions are then calculated by the arithmetic means 16.

The arithmetic means 16 determines the coefficients a, b and c for the circle equation of:

$$x^2+y^2+ax+by+c=0$$

from the stored X and Y data to calculate the center of the circle (−a/2, −b/2) and the radius:

$$((a/2)^2+(b/2)^2-C)^{1/2}$$

The coefficients a, b and c are determined by least square approximation.

With this method, actual Xi and Yi data is substituted in the circle equation:

$$x^2+y^2+ax+by+c=0$$

to obtain S as expressed by:

$$X-Xi^2+Yi^2+aXi+bYi+c$$

and to find the coefficients a, b and c which make the sum $\Sigma S^2$ minimum, the sum of $S^2$ being calculated for all the effective data (X, Y) as to the contemplated region.

The crown portion tread radius thus obtained is indicated at (II) in FIG. 2, and the shoulder portion tread radius obtained at (III) in FIG. 2. The display 17 shows these radii.

The radius of the desired region can be determined by the method described above. At least the tread crown radius and the tread shoulder radius can be determined at the same time.

Next, the calculated display of RRO will be described.

First, the shaft 3 is unlocked, and the tire 4 is rotated with the handle 5. The angle of rotation R is detected by the R detection means 6, and at the same time, the distance Y from the tire peripheral surface is measured by the Y detection means 10. The point (R, Y) is stored in the data memory means 13. Such points over the entire periphery of the tire are measured and stored.

Figure 5:
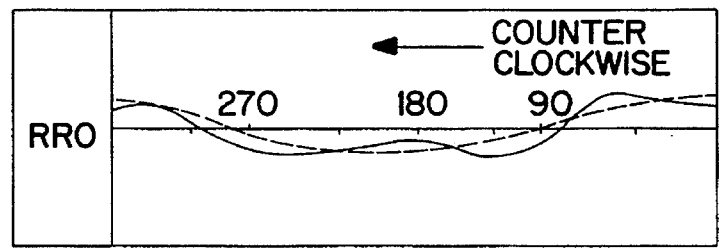
FIG. 5 is a graph showing the radial runout (RRO) of a tire.

The R and Y data is fed to the RRO display means 19 to present a graph as shown in FIG. 5.

Figure 6A:
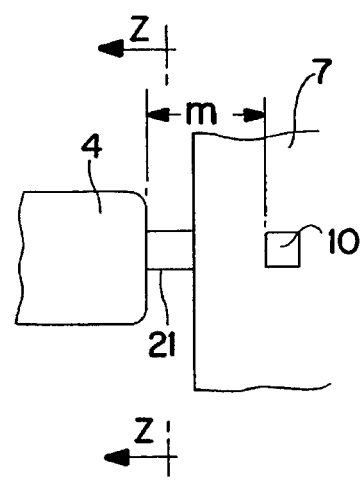
FIG. 6(a) is a diagram showing an arrangement for positioning a measuring unit.
Figure 6B:
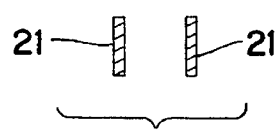
FIG. 6(b) is a sectional view along the line Z-Z in FIG. 6(a)

As seen in FIGS. 6(a) and (b), the measuring unit 7 is provided with positioning jigs (stoppers) 21 for positioning the tire surface within the range of m± 15 mm wherein m is the fixed focal length of the Y detection means 10 to thereby regulate the measuring range. When the measuring unit 7 is moved towards the tire, the forward ends of the stoppers 21 come into contact with the tire surface, whereupon the measuring unit 7 is halted.

The present invention is not limited to the above embodiment but is applicable to any articles, especially various circular articles.

What is claimed is:

1. An apparatus for determining the profile of a tire tread with distinctive determinations of radii of a crown portion and shoulder portions comprising:

a mounting means for mounting the tire about an X axis such that the tire axis is parallel to the X axis;

a non-contact type Y axis distance measuring means for measuring a Y axis distance from the tire profile thereto and movable along the X axis, the Y axis distance measured being kept as Y data;

an X axis distance measuring means for measuring an X axis position of the Y axis distance measuring means, the X axis distance being kept as X data, each value of the X data being paired with one value of the Y data;

a radius calculating means for calculating a radius of at least part of the tire profile based on the paired X data and Y data, said radius calculating means including a sorting means for classifying pairs of the X data and Y data into data classified in point of local portions of the crown portion and shoulder portions of the tire with application of reference data for the tire, and an arithmetic means for determining radii of the respective tire portions by use of the classified data; wherein said reference data represents data prestored for reference to x axis regions of shoulder portions and the crown portion defining the tire profile, on a basis that a tire equator line is zero on the X axis as datum point, said sorting means includes an end determination means for determining X data on two distal ends of the tire profile by detecting the two X data which exceed predetermined Y data, a center determination means for determining a center point from the X data on two distal ends, means for correcting the measured data with the reference data based so that the measured data as a whole is converted to be based on the datum point for the reference data, and for classifying the measured X and Y data pairs into data classified in point of the crown portion and of the shoulder portions by comparison with reference data on the crown portion and the two shoulder portions; and said arithmetic means comprises calculation resources for calculating the radii of the crown portion and the shoulder portions, respectively, with use of the classified data.

2. The apparatus of claim 1 wherein the Y distance measuring means is a laser sensor movable in the direction of the X axis.

3. The apparatus of claim 1 wherein the X axis of the Y distance measuring means is provided by means of a feed screw engaging the Y measuring means and disposed parallel to the X axis and provided with a rotary encoder for detecting rotation of the feed screw to give the X data.

4. The apparatus according to claim 1 wherein the data memory means and the radius calculating means are a computer.

5. The apparatus of claim 1 further comprising tire rotation means provided to rotate the tire about its X axis, R detection means provided to detect the angle of rotation of the tire and output an R angle data, the data memory means storing said R angle data and radial runout (RRO) calculation means to determine the radial runout of the tire from the Y and R data in the data memory means.

6. A method of determining the profile of a tire tread with distinctive determinations of radii of a crown portions and shoulder portions comprising the steps of:

a. mounting the tire to a measuring apparatus with the tire axis being in parallel to an X axis;

b. inputting reference data on the tire to be measured into a data memory means, said reference data, based on a tire equator line set at a zero X axis point, including standard X axis lengths of the crown portion and shoulder portions of the profile for the tire to be measured, c. measuring a Y axis distance from a Y axis distance detection means of the measuring apparatus to the tire profile to keep a measurement as Y data;

d. measuring an X axis position of the Y axis distance detection means corresponding to the Y data measurement and keeping such a measurement as X data;

e. repeating the steps c and d while moving the Y axis distance detection means along the X axis;

f. determining X axis data on two distal ends of the tire profile by finding the two X data which exceed predetermined Y data, g. determining a center point from the X axis data on the two distal ends, h. correcting the measured data on the center point with the reference data on the equator line as a new datum point so that the measured data as a whole is converted to be based on the new datum point, and classifying the measured data comprising X and Y data pairs now converted into data classified in point of the crown portion and on the shoulder portions with reference to the reference data; and i. calculating radii of the crown portion and the shoulder portions, respectively, with use of the classified data.

7. The method of claim 6 wherein the X and Y data are divided into groups for the crown portion and the shoulder portions of the tire, respectively.

8. The method of claim 7 wherein the division of the X and Y data is carried out by determining the opposite end values of X data stored in the data memory means for which tire distance Y data exists, determining the mid-point between the opposite end X data values and comparing the X data based on the mid-point with reference values of the crown portion and reference of the shoulder portions which have been entered in advance.

9. The method of claim 6 wherein the tire is rotated about its X axis and the R angle data corresponding to particular X and Y values are calculated to determine the radial runout of the tire with respect to the X axis.

* * * * *